June 28, 1927.
K. B. KILBORN ET AL
1,633,587
TIRE VULCANIZING DEVICE
Filed Nov. 15, 1922
2 Sheets-Sheet 1
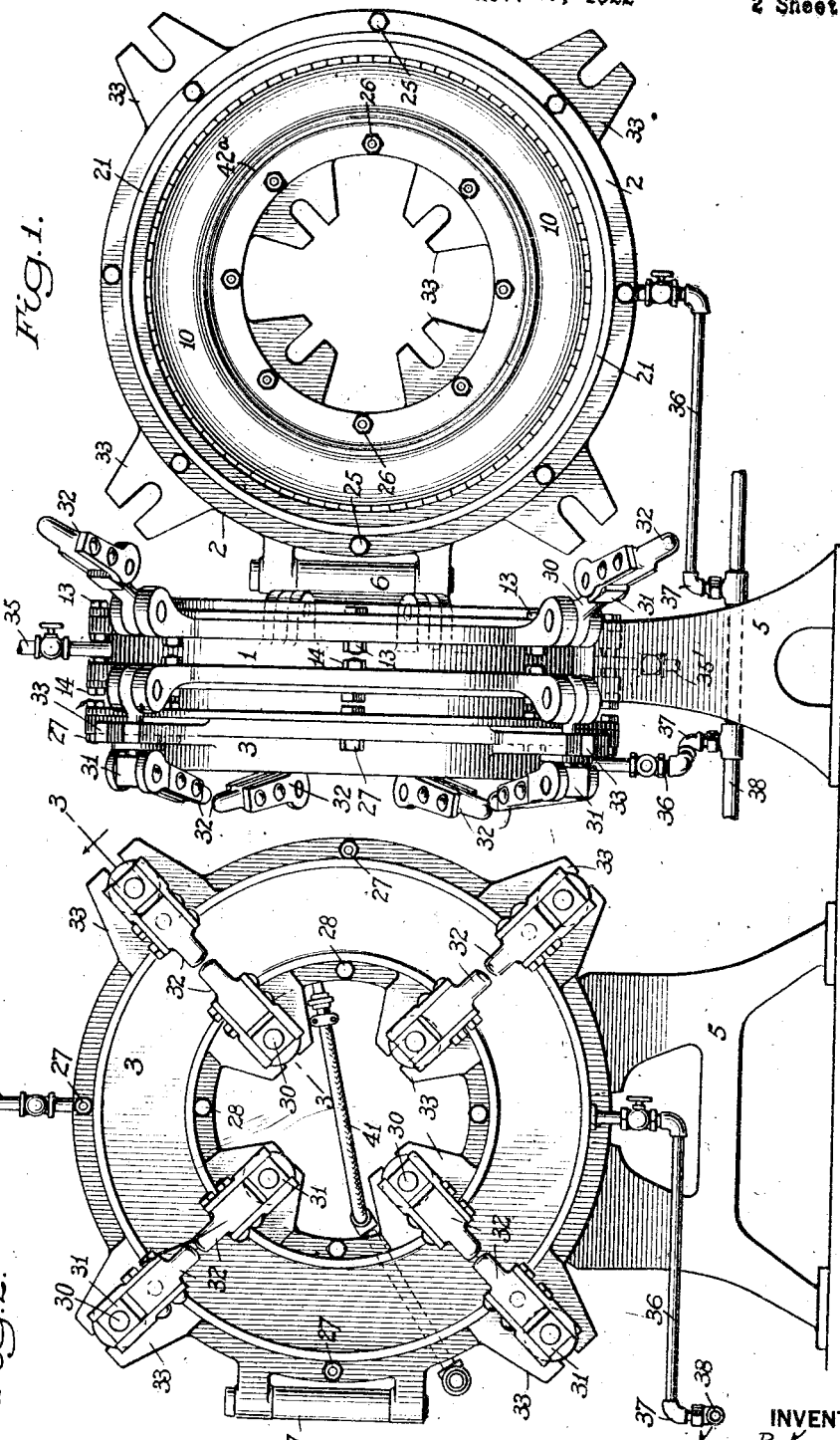
INVENTORS
KARL B. KILBORN
WILLIAM S. WOLFE
BY
ATTORNEYS June 28, 1927.

K. B. KILBORN ET AL 1,633,587

TIRE VULCANIZING DEVICE

Filed Nov. 15, 1922  2 Sheets-Sheet 2

Inventors
Karl B. Kilborn and
William S. Wolfe.
By Rogers, Kennedy Campbell
their Attorneys.

Patented June 28, 1927.

1,633,587

UNITED STATES PATENT OFFICE.

KARL B. KILBORN AND WILLIAM S. WOLFE, OF AKRON, OHIO, ASSIGNORS TO SEIBERLING RUBBER COMPANY, OF AKRON, OHIO, A CORPORATION OF DELAWARE.

TIRE-VULCANIZING DEVICE.

Application filed November 15, 1922. Serial No. 601,045.

This invention relates to an apparatus for vulcanizing rubber tires and more particularly to a device of the type disclosed in the U. S. Letters Patent to C. E. Miller, No. 1,234,065. In a device of this general type, as heretofore constructed, the mold cavities and the associated heating chambers have been formed in integral cored-out castings. As the device is thus constructed, its manufacture or repair is both troublesome and expensive. Moreover, by reason of the varying thickness of the mold walls, it is difficult to obtain the uniform heating of the mold surfaces, thus giving rise to the under-curing of the tires at certain portions and causing their rapid deterioration when in service. Furthermore, due to the integral or permanent nature of the mold walls, the device is adapted for use only in connection with tires of a single size and of a single design.

The present invention is intended to overcome the foregoing and other objections, and aims to produce a tire vulcanizing device which is of simple mechanical construction, thoroughly efficient in operation, and capable of use with tires of various sizes and designs. To attain these objects, the invention, generally speaking, contemplates the formation of the mold cavities and the heating chambers in separate or distinct parts which are made to fit together in fluid-tight condition, and which are detachably connected in such manner as to permit the ready removal and replacement of the mold sections when desired.

The invention also aims to facilitate and expedite the insertion and removal of the tires in and from the individual mold cavities, and in this connection contemplates the employment of an air-bag rim, on which a tire is supported, for the closure of the inner side of the mold cavity during vulcanization.

These and various other features will be fully pointed out in the detailed description which follows.

In the accompanying drawings:

Fig. 1 is a front elevation of a vulcanizing device constructed in accordance with this invention and showing one of the casing members in open condition;

Fig. 2 is a side elevation; and

Figure 3:
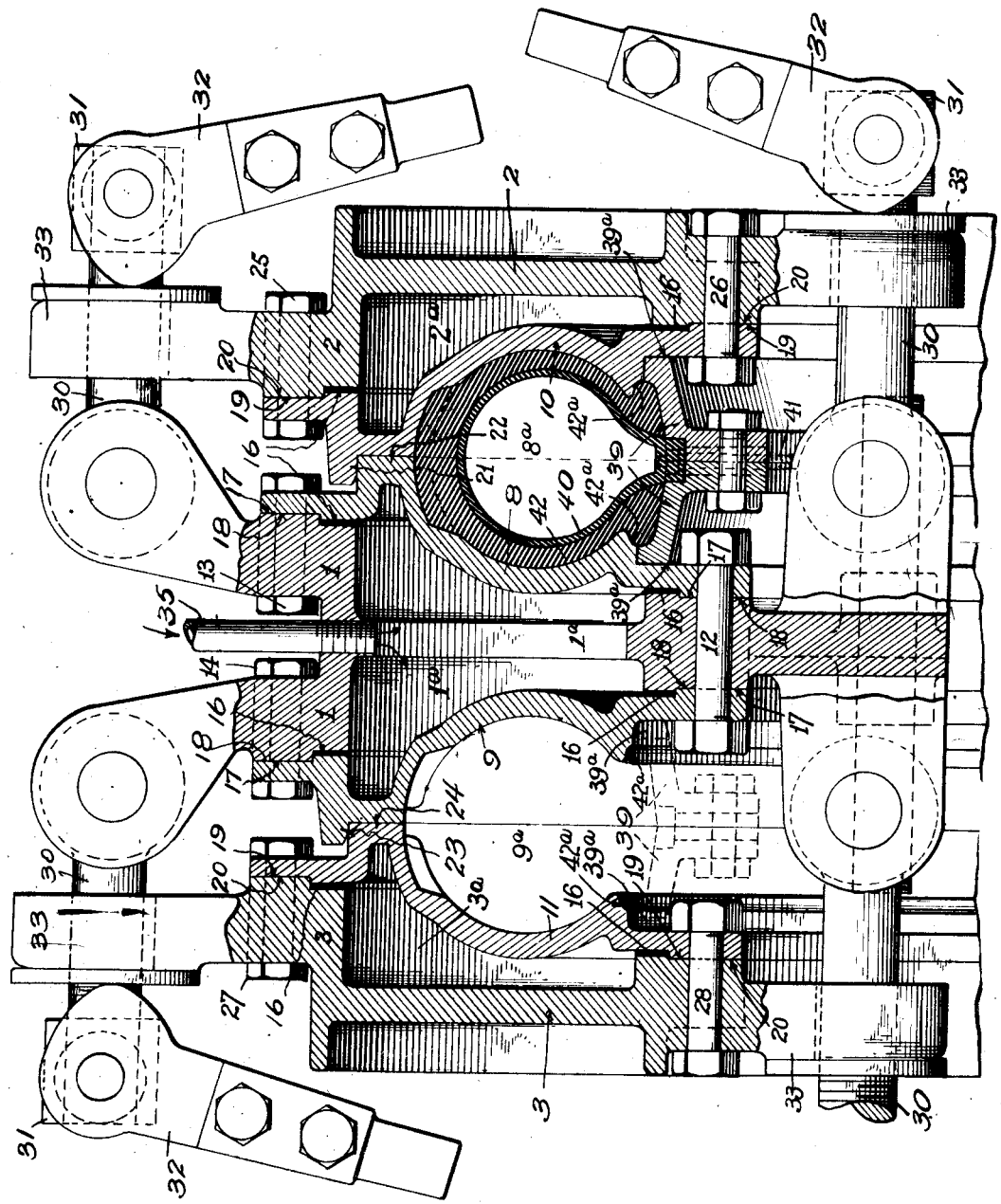
Fig. 3 is a transverse section, on an enlarged scale, taken on the line 3—3 of Fig. 2 and looking in the direction of the arrows.

In the embodiment illustrated, the vulcanizing device comprises a central stationary ring-like casing member 1 mounted on a base 5, and two side ring-like casing members 2 and 3 hinged to the central member 1, as at 6 and 7, so as to be swung to open or closed condition, as desired. The central casing member 1 contains an annular heating chamber 1ª, whose opposite side walls are constituted by mold rings or sections 8 and 9. The side casing members 2 and 3 also contain annular heating chambers 2ª and 3ª, whose inner walls are constituted by mold rings or sections 10 and 11, respectively, the former cooperating with the mold section 8 to define a mold cavity 8ª, and the latter cooperating with the mold section 9 to define a mold cavity 9ª. Steam is admitted to the central heating chamber 1ª through a pipe 35 and to the side heating chambers 2ª and 3ª through pipes 36, these latter being swiveled, as at 37, to a main supply pipe 38 in line with the pivots 6 and 7 to permit the outward swinging of the side members 2 and 3 without interfering with the steam connections. Each heating chamber is provided with a drain, such as a pipe 35', for the condensed steam.

According to the present invention, the mold rings or sections, above referred to, are made separate from their respective casing members and are designed to be removed and replaced at will. Thus, the two mold sections 8 and 9 are detachably connected at opposite sides to the central casing member 1 by means of three sets of bolts 12, 13 and 14, the bolts 12 being common to both mold sections and serving to clamp them tightly to the casing member at their inner edges, and the bolts 13 and 14 serving to clamp the mold sections individually to the casing member at their outer edges, see particularly Fig. 3. The mold sections 10 and 11 are similarly connected to the side casing members 2 and 3 by bolts 25, 26 and 27, 28, which clamp each ring and its casing member tightly together at both inner and outer edges. The casing member 1 and the connected mold sections 8 and 9 are formed with accurately machined shouldered portions 17 and 18, whose side contacting faces determine the proper lateral location of the mold sections, and whose peripheral contacting faces determine the proper centered relation of said sections. The side casing members 2 and 3 and their respective mold sections 10 and 11 are provided with similar shouldered portions 19 and 20, which determine the lateral and centered relation of these mold sections. The complementary mold sections 8, 10 and 9, 11 are further formed with interlocking shoulders 21, 22 and 23, 24, respectively, which insure the proper mating of these parts in the closed condition of the casing members. In this connection, it is pointed out that the shoulders 21 and 23 are beveled or chamfered along their inner edges to facilitate the closing of the mold sections. Gaskets 16 are interposed between each mold section and its corresponding casing member at both their inner and outer edges, in order to render the heating chamber defined thereby absolutely fluid tight.

It will be noted that the mold sections 8, 10 and 9, 11 do not contact with each other at their inner edges but are separated so as to leave the mold cavities 8ª and 9ª open at their inner circumferences. Such mold cavities, however, are closed by air-bag rims 39 fitted snugly in recesses 39ª formed in the opposed faces of the mold sections. In Fig. 3, one of these rims is shown as provided with an air bag 40 having fluid connections 41 and with a tire casing 42 (of the clencher type) supported thereon, the bead portions of the casing being seated in recesses 42ª formed in the mold sections.

Locking means are provided to maintain the parts in intimate mating relation during vulcanization. In the present instance, such locking means consist of a series of bolts 30 pivoted to suitable lugs disposed around the central casing member 1 at both its inner and outer periphery and adapted to cooperate with slotted arms 33 correspondingly disposed around the side casing members 2 and 3. Each of the bolts 30 is provided at its free end with an adjustable nut 31 carrying an eccentric or cam-shaped lever 32 adapted to engage the outer face of the corresponding arm 33 in clamping the parts together.

The operation of the improved device will now be entirely clear: The tire casings 42, after being built according to any of the well known methods, are provided with air bags 40 and mounted upon the air-bag rims 39. As thus mounted, the casings are placed in the mold cavities 8ª and 9ª, the side casing members 2 and 3 being opened for that purpose. The side members are then closed and the cam-shaped levers 32 operated to lock the mold sections together and with the air-bag rims firmly clamped between them. The air bags are then inflated through the connections 41, and steam admitted to the heating chambers 1ª, 2ª and 3ª through the pipes 35 and 36. After the tire casings have been subjected to a prescribed heat for a definite length of time, the air bags are deflated, the clamping levers released, and the side casing members swung outwardly to permit the removal of the cured casings. A new set of casings may then be inserted and the above operation repeated.

Due to the removable nature of the mold sections, it is apparent that the device may be used for the vulcanization of tire casings of various sizes and designs, it simply being necessary to loosen and tighten up the clamping bolts before and after replacement of the mold sections. This interchangeability of the mold sections is greatly facilitated by reason of their shouldered portions which insure the proper location of the sections on the casing members as well as the mutual cooperation of such sections in the closed condition of the casing members. Moreover, being in the form of separate parts, the mold sections may be made of uniform thickness throughout so as thus to insure the uniform heating of all portions of the tire casings. This feature is further advantageous, in that it enables the device to be built without difficulty and at low cost and also provides for the ready repair or replacement of any broken or worn out parts. It is also pointed out that the use of air-bag rims for the closure of the mold cavities is particularly desirable, inasmuch as the tire casings may be mounted within the mold cavities with the greatest possible convenience and without remounting the casings. These and various other advantages will be readily appreciated by those skilled in the art.

The invention is not of course confined to the precise construction shown and described, nor to any other particular construction by which the same may be carried into effect, as many changes may be made in the details without departing from the main principles of the invention and without sacrificing its chief advantages. It is to be understood therefore that the invention is not limited to any specific form or embodiment, except in so far as such limitations are set forth in the appended claims.

Having thus described our invention, what we claim is as follows:

1. A tire vulcanizing device comprising a central casing member having an annular cavity open at its opposite sides and defined by inner and outer walls having annular side seating surfaces, annular mold sections formed at their inner and outer edges with surfaces adapted to seat against said seating surfaces on the central casing member so as to close the open sides of the cavity and form in connection therewith a central heating chamber, releasable fastening devices engaging the edges of the mold sections and the inner and outer walls of the casing member and acting to hold the mold sections detachably in place, side casing members hinged to said central casing member and provided each with a cavity opening inwardly and defined by inner and outer marginal walls and an outer side wall, said marginal walls having annular side seating surfaces, an annular mold section applied to and closing the inner side of the cavity of each side casing member, said mold section being formed at its inner and outer edges with surfaces adapted to seat against the seating surfaces on its associated casing member and forming in connection therewith an annular heating chamber, and releasable fastening devices engaging the inner and outer edges of the last mentioned mold sections and the inner and outer walls of the outer casing members, and acting to hold said mold sections detachably in place.

2. A tire vulcanizing device according to claim 1 characterized by the fact that the seating surfaces on the casing members, and the surfaces on the mold sections which cooperate with said seating surfaces, are shouldered to insure the proper centered relation of the mold sections.

3. A tire vulcanizing device comprising a central mold section, hinged side mold sections adapted to cooperate therewith in defining a mold cavity, a plurality of bolts pivoted to said central section and having threaded extremities, slotted arms extending from said side sections and adapted to receive said bolts, an adjustable nut mounted on the extremity of each bolt, and an eccentric clamping cam pivotally mounted on each of said nuts and having a lever for effecting its operation.

In testimony whereof, we have affixed our signatures hereto.

KARL B. KILBORN.
WILLIAM S. WOLFE.